(12) United States Patent
Galuten

(10) Patent No.: US 9,811,799 B2
(45) Date of Patent: Nov. 7, 2017

(54) DISTRIBUTED CUSTOMER SUPPORT CREDITS

(75) Inventor: Albhy Galuten, Santa Monica, CA (US)

(73) Assignees: SONY ELETRONICS, INC., Parkridge, NJ (US); SONY CORPORATION, Tokyo (JP)

( * ) Notice: Subject to any disclaimer, the term of this patent is extended or adjusted under 35 U.S.C. 154(b) by 968 days.

(21) Appl. No.: 13/158,157

(22) Filed: Jun. 10, 2011

(65) Prior Publication Data

US 2011/0307393 A1    Dec. 15, 2011

Related U.S. Application Data

(60) Provisional application No. 61/353,615, filed on Jun. 10, 2010.

(51) Int. Cl.
| | | |
|---|---|---|
| G06F 21/00 | (2013.01) | |
| G06Q 10/08 | (2012.01) | |
| G06Q 10/00 | (2012.01) | |
| G06Q 30/00 | (2012.01) | |

(52) U.S. Cl.
CPC ........... *G06Q 10/087* (2013.01); *G06Q 10/20* (2013.01); *G06Q 30/016* (2013.01)

(58) Field of Classification Search
CPC .................................................. G06Q 2220/18
USPC ............................................................ 705/59
See application file for complete search history.

(56) References Cited

U.S. PATENT DOCUMENTS

| | | | |
|---|---|---|---|
| 6,038,597 A | 3/2000 | Van Wyngarden | |
| 6,177,932 B1 | 1/2001 | Galdes et al. | |
| 7,519,475 B2 | 4/2009 | Newman | |
| 8,776,257 B2* | 7/2014 | Reed ..................... | H04L 9/0866 726/27 |
| 2001/0041988 A1* | 11/2001 | Lin ......................... | G06Q 30/02 705/1.1 |
| 2002/0052754 A1* | 5/2002 | Joyce et al. ....................... | 705/1 |
| 2002/0188520 A1 | 12/2002 | Willner et al. | |
| 2003/0023508 A1* | 1/2003 | Deep .................. | G06Q 30/0283 705/26.1 |
| 2004/0068431 A1* | 4/2004 | Smith et al. ..................... | 705/10 |

(Continued)

FOREIGN PATENT DOCUMENTS

JP    2003-178093 A    6/2003

OTHER PUBLICATIONS

Liberty Alliance—Wikapedia; http://en.wikipedia.org/wiki/Liberty_Alliance, Jan. 30, 2008.

(Continued)

*Primary Examiner* — Charles C Agwumezie
(74) *Attorney, Agent, or Firm* — Chip Law Group

(57) ABSTRACT

In a method, system, and computer-readable medium having instructions for providing distributed customer support, a customer care provider for a first business entity receives a request for customer care and the request may be handled by the customer care provider with a remedy, transaction information involving any number of transactions from a repository is accessed using a customer care credential and the repository comprises transaction information for a second business entity, and a limitation on the customer care provider is determined for providing the remedy using the transaction information.

20 Claims, 6 Drawing Sheets

(56) References Cited

U.S. PATENT DOCUMENTS

| | | |
|---|---|---|
| 2005/0114304 A1 | 5/2005 | White et al. |
| 2005/0144084 A1 | 6/2005 | Gold et al. |
| 2005/0192871 A1 | 9/2005 | Galuten et al. |
| 2005/0203765 A1 | 9/2005 | Maritzen et al. |
| 2007/0038519 A1 | 2/2007 | Johansson et al. |
| 2007/0294090 A1 | 12/2007 | Thieret et al. |
| 2010/0058447 A1* | 3/2010 | Wang .................. G06F 21/41 726/4 |

OTHER PUBLICATIONS

Liberty Alliance—Home; http://www.projectliberty.org/, Jan. 30, 2008.
Liberty Alliance—Specifications; http://www.projectliberty.org/resources/specifications.php, Jan. 30, 2008.
Security Assertion Markup Language—Wikipedia; http://en.wikipedia.org/wiki/SAML, Jan. 30, 2008.
Security Assertion Markup Language (SAML); http://xml.coverpages.org/saml.html, Jan. 30, 2008.
OASIS Security Services (SAML); http://www.oasis-open.org/committees/tc_home.php?wg_abbrev=security.
TM Forum—IPDR home; http://www.ipdr.org/, Jan. 30, 2000.

* cited by examiner

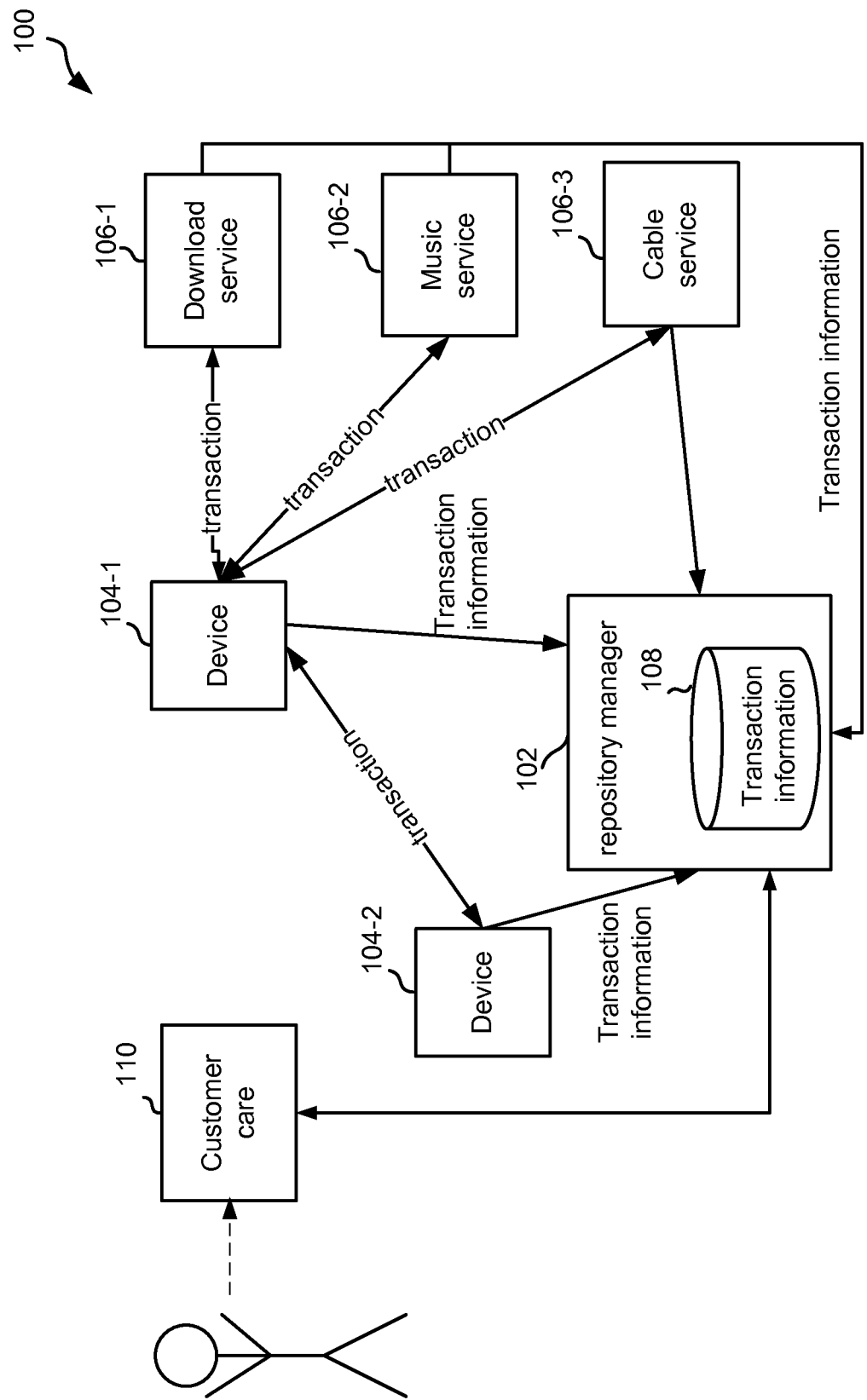

DISTRIBUTED CUSTOMER SUPPORT CREDITS

CROSS REFERENCES TO RELATED APPLICATIONS

This application claims priority from U.S. Provisional Patent Application Ser. No. 61/353,615, entitled "DISTRIBUTED CUSTOMER SUPPORT CREDITS," filed on Jun. 10, 2010, which is hereby incorporated by reference as if set forth in full in this application for all purposes.

BACKGROUND

Approaches to electronic video distribution may involve studios providing credits to service providers to enable the service providers to resolve customer care/support issues. With the provision of "credits" to service providers, it may be desirable to limit the exposure to fraud. For example, studios may not allow a consumer to re-download a movie that the consumer has already downloaded.

However, sometimes there are failures with the distribution of content, such as with a download and/or a device (e.g., shortly after the download but before viewing) and it may be reasonable to allow the consumer to re-download the movie for a legitimate failure with the provision of a video distribution. Accordingly, it is desirable to provide techniques for enabling the distribution of credits while limiting the exposure to fraud.

SUMMARY

In a method, system, and computer-readable medium having instructions for providing distributed customer support, a customer care provider for a first business entity receives a request for customer care and the request may be handled by the customer care provider with a remedy, transaction information involving any number of transactions from a repository is accessed using a customer care credential and the repository comprises transaction information for a second business entity, and a limitation on the customer care provider is determined for providing the remedy using the transaction information.

FIELD OF THE INVENTION

Particular embodiments generally relate to computing, security and more specifically, to consumer electronic devices and media services.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 1C depicts a system for providing customer support in an example of an implementation of distributed customer support credits according to an embodiment.

DETAILED DESCRIPTION OF EMBODIMENTS

Figure 1A:
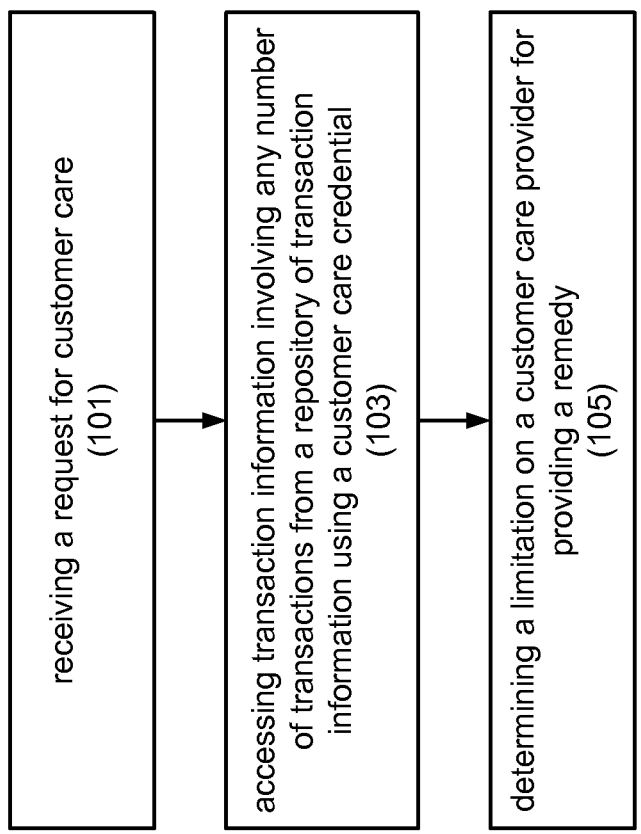
FIG. 1A depicts a flow chart for an example of an implementation of distributed customer support credits according to an embodiment.

Systems, methods, apparatuses, computer readable mediums, and computer program products are provided for distributed customer support credits. Embodiments may provide access to transaction information for one or more business entities to determine a limitation on a remedy available to a customer care provider. A remedy may be a credit toward a download of content and/or files that support the content, a domain based remedy (e.g. registering a device in a domain), a streaming based remedy, creation of an account, a provision of a password, and/or any other remediation action used for customer care. Customer care is a service that provides customer support to one or more users of a device, software, and/or a service. The term "user" and "customer" are to be construed broadly as a person, a customer, and/or a method executed on behalf of a customer, and the terms "user" and "customer" may be used interchangeably throughout.

A limitation on a remedy may be an amount of a particular remedy available to a customer care provider(s) to give to a customer. The limitation on a remedy may be any effort and/or approach to limit the exposure to fraud for the business entity. In an embodiment, a limitation for a remedy may be a number of a particular remedy that the customer care provider is allowed to distribute. Examples of remedies include, but are not limited to, the following: a limit on access to a remedy for a particular user, a limit on access to a remedy based upon a type of customer care request, a limit on a remedy for a customer care provider or representative, and/or any other limitation that may be placed on a remedy available to aid a user with customer care. For example, a customer care provider may have a limitation that allows the provider only a certain percentage of available credits for a service that a service provider makes available for a group of customer care providers supporting the service.

A customer care provider may be a user providing customer support (e.g. a customer care representative), a business entity, a software method or process, a service executing on one or more computer systems to handle customer support requests, and/or any other mechanism that provides customer support. In an embodiment, the customer care provider may be a business entity with representatives that supports a device, a piece of software, and/or content that the business entity does not manufacture, design, or retail.

Transaction information may be any information on the history of transactions involving a device and/or piece of software that is supported by the customer care provider. A transaction is an agreement, a communication, and/or action carried out involving goods, services, devices, information, and/or money. In one or more embodiments, the transaction information may be for transactions involving a business entity other than the business entity of the customer care provider. For example, the customer care provider may be a first business entity and the transaction information may be from a second business entity, such as a device manufacturer or retailer for a device that the customer care provider supports.

The use of transaction information from one or more business entities may ensure that a limitation on a remedy is applied across all customer care providers for a device, software, content, and/or service. In another example, the customer care provider may be a first business entity providing customer support and the transaction information may be from a second business entity, such as another customer care provider, a device manufacturer, service provider, and/or a content provider. The transaction information may be customer care transactions from customer care providers, device purchase transactions, software purchase transactions, device domain transactions, credit card information, license information, and/or any other transaction information from a business entity.

Transaction information may be stored in a repository either local and/or remote to the customer care provider. A repository may be any collection of data, including but not, limited to, the following: a relational database, an object oriented database, a cache, a file system, and/or any other collection of data. In one or more embodiments, a database server may be used to handle requests for data from the repository. In an embodiment, the repository may be virtual and may be a presentation of an aggregation of data stored at different locations. For example, a repository may be an aggregation of data created on-the-fly by accessing data from one or more databases and presenting or providing the aggregation of data for calculation of limitations.

A customer care credential may be provided to the customer care provider to permit or enable access to the transaction information in a repository. In an embodiment, a customer care credential may be "access information" that is provided by and/or provided with permission from the customer. For example, the customer care credential may be seen as permission given by the customer such that the customer care provider stands in the place of the customer and is able to retrieve transaction information on the customer's behalf. Continuing with this example, a first business entity may use the customer care credential to retrieve transaction information from a repository on behalf of the customer and access transaction information in the repository ordinarily reserved to the customer.

In another embodiment, the customer care credential may be provided by the customer care provider business entity or a partner business entity with the customer care provider. A partner customer care provider or customer/user may grant permission to access their transaction information, at any level of granularity. For example, a first business entity may be granted access to all transaction information for a second business entity or granted access to a limited of the transaction information for the second business entity. Continuing with the example, the second business entity may only grant access to transaction information relevant to a heuristic used to calculate or determine a limitation on a remedy for the customer care provider.

In an embodiment, a heuristic may be used in conjunction with the transaction information to determine a limitation on a remedy for a customer care provider. A heuristic is a rule, an educated guess, a formula, a judgment, and/or any other method for determining a limitation. For example, a heuristic for a limitation may be to limit the number of credits, such as a download of content, to 1% of users of a device and/or users accessing content.

Transaction information on users from all participating business entities may be used to calculate the number of users to determine the percentage and thereby determine the number of downloads permitted. Transaction information may also provide the number of downloads that have been performed or distributed as a remedy by the customer care providers.

By way of example, in order to limit their exposure to fraud, a studio may allow only a certain number of downloads or more generally, customer care remedies, such as customer care "credits" to permit re-downloads. Although examples are provided in regards to video distribution, those skilled in the art will recognize that customer care credits may be offered for a variety of services, including, but not limited to, software distribution, music distribution, image distribution, font distribution, and any other type of data.

FIG. 1A depicts a flow chart for an example of an implementation of distributed customer support credits. A request for customer care may be received (101). The request may be handled by a customer care provider with a remedy. The request may be in the form of a request sent electronically, a request made verbally, and/or any other method for communicating the need for customer care. For example, a request may be sent from a client application executing on a computer system to a server. The request may be received by a customer care provider that is associated with a first business entity and the availability of a remedy to handle the request may be determined using transaction information from a second business entity.

Transaction information involving any number of transactions from a repository of customer care transaction information using a customer care credential may be accessed (103). The repository may have transaction information for one or more business entities. The transaction information may be from a second business entity that differs from the first business entity associated with the customer care provider. The transaction information may be for transactions for a user of device, a customer care provider, a device manufacturer, a service provider, a software vendor, a retailer, a DRM license provider, a credit reporting business, a location-based business, and/or any other business performing transactions that may pertain to the provision of a remedy. The second business entity may collect transaction information based upon location, ip address, and/or any other method for collecting information on a user and/or device.

The repository may be any collection of data, such as a database, cache, and/or any combination thereof. In an embodiment, the customer care provider may initially access the transaction information by retrieving the transaction information from a local repository, such as a database available internally for the business entity (e.g. on an internal network for the business entity and/or a cache that has transaction information for the first business entity previously retrieved by the customer care provider). In another example, the transaction information may be accessed by reading the transaction information at the server. In an embodiment, the transaction information may be accessed (e.g. by reference) and the data may remain on the server. In another embodiment, the data may be pulled or retrieved from the server.

It may be desirable to access and/or retrieve information from a global repository, such as a database over a network with transaction information from one or more customer care providers or business entities to ensure a limitation across all customer care providers. For example, a limitation may be placed on a particular credit across all customer care providers and limitation may need to be determined by reviewing the history of transactions for all customer care providers supporting the device, the software, the content, and/or service.

A limitation maintained across all customer care providers may prevent or limit the ability for a user to ask for the same remedy from multiple customer care providers. For example, the user's history of transactions across one or more customer care providers may be accessed in a global repository to ensure that the user is not receiving the same remedy (e.g. credits for downloads) from customer care providers for the same or similar customer care request. In another example, the user's history of transaction may be accessed to verify that the user's request is valid or consistent (e.g. a check of the transaction history with other customer service providers and/or an insurance company that can verify a disaster at the user's household).

A customer care credential may permit the retrieval of the transaction information. The customer care credential may be in any format that would allow for recognizing the customer care provider as having permission and/or authority to access the transaction information. For example, the customer care credential may be a password, a certificate, an electronic signature, and/or any other data enable recognition that the customer care provider has permission to access the transaction information. In an embodiment, a device user or customer may give the customer care provider permission to retrieve transaction information on their behalf and/or as though the customer care provider stood in the place of the user.

The customer care credential may be provided by a user that desires customer care, a customer care provider business entity, a device manufacturer, and/or any other business entity or user involved in supporting or using a device or service. In an embodiment, the customer care credential may be "access information", as described in U.S. patent application Ser. No. 12/022,971, entitled REPOSITORY INFRASTRUCTURE TO STORE TRANSACTION INFORMATION FOR PROVIDING CUSTOMER SERVICE, and is incorporated by reference herein. In another embodiment, the second business entity may give the customer care provider of the first business entity a customer care credential to access the transaction information for the second business entity.

A limitation on a customer care provider for providing the remedy using the transaction information may be determined (105). The limitation may be determined by calculating the limitation with transaction information and/or reviewing the transaction information to determine an exact limitation for the customer care provider. One or more heuristics may be used in combination with the transaction information to determine the limitation. The heuristic may be a rule or a formula that may define a limitation on a remedy for a customer care provider.

Although embodiments may be described that focus on heuristics that determine how many times content can be downloaded or licensed provided, those with skill in the art will recognize that any other risk management heuristics may be used. For example, heuristics may depend on the time of day, on how good a customer the user is, various exceptions may be applied, ip address, using location based information and/or any other risk management heuristic.

The heuristic may depend on information contained in the transaction information to determine the limitation on the remedy, such as the history of transactions for the user, the customer care provider, the device manufacturer, and/or software or content provider. For example, the customer care provider may have a limitation defined with a heuristic that allows the supply of credits for 1% of all customers that the provider supports. The transaction information may need to be reviewed to calculate the limitation (e.g. the 1%) and to calculate the number of credits the customer care provider has already provided. In another example, a heuristic may be defined that limits the provision of a remedy to a percentage of households in a territory.

In an embodiment, the transaction information may be used to determine the limitation both by calculating the limitation and examining the history of transactions for the customer care provider to determine the exact limitation for the customer care provider. For example, the limitation may be calculated to 100 credits (e.g. in line with a heuristic of 1% if all customers that the customer care provider supports). Continuing with the example, the history of transaction information may reveal that the customer care provider has provided 99 credits previously and only one more credit is available to the customer care provider.

In one or more embodiments, a customer care provider may only be able to supply a certain number of licenses to users as a remedy for customer care issues. For example, a heuristic may be defined to limit the number of licenses to a percentage of the number of transactions for all customer care providers supporting a particular type of device. Continuing with the example, information on transaction information for all customer care providers for the particular device including the number of transactions and the number of transactions that result in the use of a license may be retrieved in order to determine the limitation on the license remedy for the customer care provider in accordance with the heuristic.

In one or more embodiments, a distributed customer care environment as envisioned in U.S. patent application Ser. No. 12/022,971, entitled REPOSITORY INFRASTRUCTURE TO STORE TRANSACTION INFORMATION FOR PROVIDING CUSTOMER SERVICE, filed on Jan. 30, 2008 which claims priority from U.S. Provisional Patent Application Ser. No. 60/983,035, entitled REPOSITORY INFRASTRUCTURE TO STORE TRANSACTION INFORMATION FOR PROVIDING CUSTOMER SERVICE filed on Oct. 26, 2007, which are hereby incorporated by reference as if set forth in full in this application for all purposes, may be used to implement embodiments of distributed customer support credits.

Customer care data may be stored in a number of different places, repositories, and/or databases. The kinds of customer care credits can be many and varied. In an embodiment, the limitation on credits (e.g. a remedy) may be applied on a sliding scale sufficient to effectively manage the user/consumer experience and limit jeopardizing the value of the content.

In one or more embodiments, axes on which provision of customer care credits and/or remedies may pivot, include, but are not limited to, the following:

1) The number of users, devices, accounts, and domains that a customer care provider supports,
2) The number and kind of credits that a customer care provider can use to resolve issues,
3) The number of credits an individual user may have used across one or more customer care providers.

In an embodiment, exceptions can be made to the general rules or heuristics. By way of example, if a licensing arrangement with a content provider allows for the removal (and/or replacement) of only two devices a year from a family's or customer's domain of devices in order to prevent fraud (e.g., selling devices full of content and requesting replacement). If, however, a customer's house is destroyed by fire or robbed and all of their devices are stolen or destroyed, then the customer may be allowed to replace a full set of devices. The licensing arrangement with a studio may prohibit the replacement of the devices but an exception may be made for a percentage of users.

This percentage may be managed by the customer care provider so that a potential attack may be turned into a risk management exercise. The customer care representative may be given discretion to diverge from the usage behavior values (e.g. extra device removals as noted above) up to a number for a percentage of their users. Continuing with the example, a heuristic for a limitation may be defined that allows 1% of the users who come to the customer care representative on an annualized basis be allowed to have 3 device removals, 0.5% of the devices will be able to have 4 and 0.1% will be able to have 10. In this way, the customer care service can manage their customers effectively while still limiting the risk of fraud.

Figure 1B:
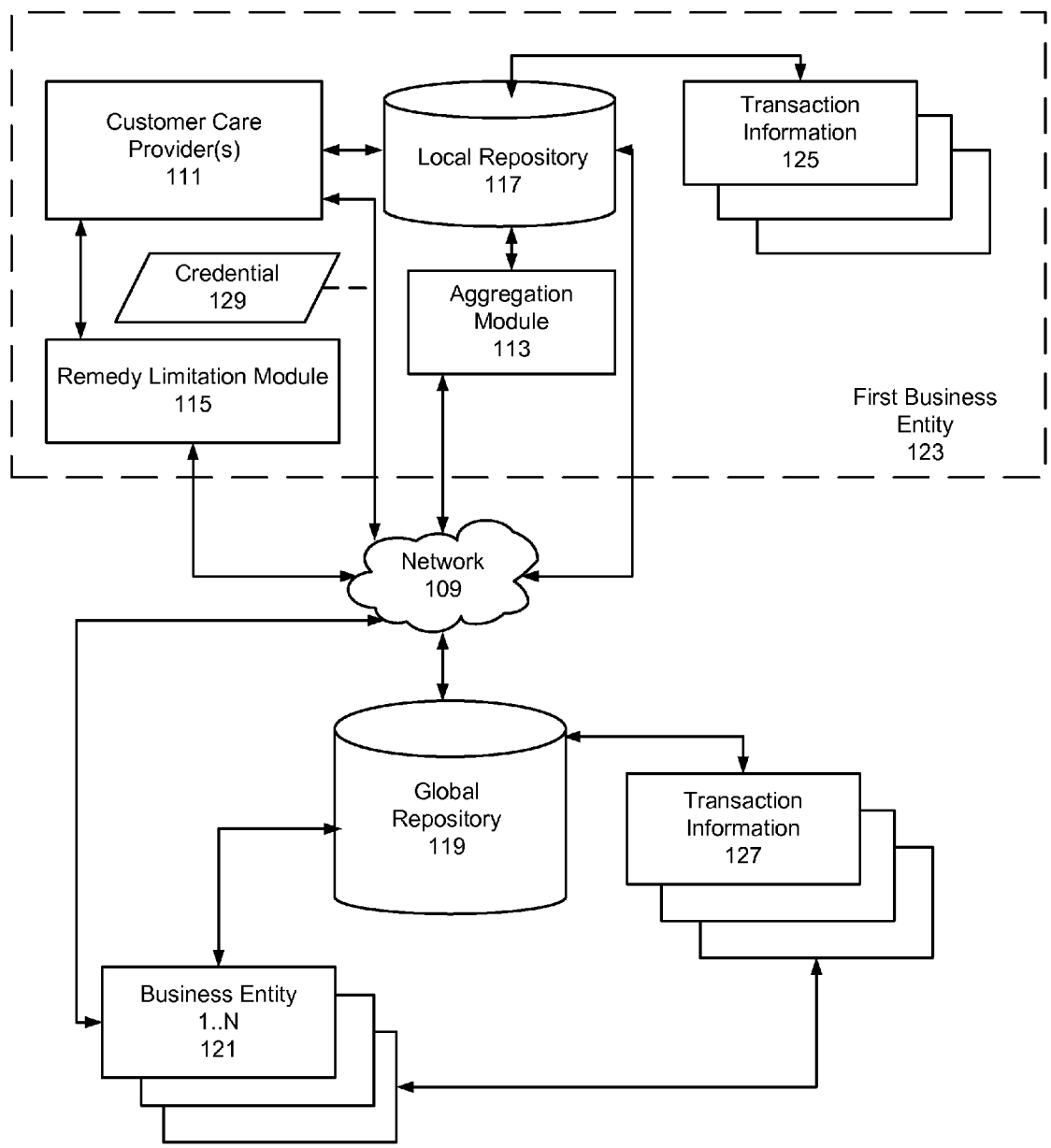
FIG. 1B depicts a system for providing customer support in an example of an implementation of distributed customer support credits according to an embodiment.

FIG. 1B depicts a system for providing customer support in an example of an implementation of distributed customer support credits according to an embodiment. A network 109 is an infrastructure for sending and receiving signals and messages according to one or more designated formats, standards, or protocols. A Network 109 may provide for both wired and wireless communication between the various elements of FIG. 1B. Embodiments may rely on a Network 109 for communication between elements of an implementation of distributed customer support credits as depicted, including, but not limited to, Customer Care Provider 111, Aggregation Module 113, Remedy Limitation Module 115, a Local Repository 117, a Global Repository 119, and Business Entities 1 . . . N 121.

The Customer Care Provider 111 may be a representative (e.g. an individual), a business entity, software executing on a computer system, and/or any other entity or service that receives requests for customer care for a First Business Entity 123. The requests may be client requests to a server, requests by phone email, and/or any other type of communication for customer care.

The Customer Care Provider 111 may have a Local Repository 117 of Transaction Information 125 (e.g. a history of transactions). The Local Repository 117 may be any collection of data, such as a database, a cache, and/or a file system. In an embodiment, the Local Repository 117 may be a database, such as an object-oriented database or relational database that allows the data to be accessed with requests to a database server. In another embodiment, the Local Repository 117 may be a collection of data stored in a computer system remote from Customer Care Provider 111 and available over the network. The Local Repository 117 may contain the transaction history for one or more Customer Care Provider(s) 111 of the First Business Entity 123. In another embodiment, the Local Repository 117 may be a cache with information from recent calculations or determinations for a limitation on a remedy for the Customer Care Provider 111. The Local Repository 117 may be construed broadly as any collection of data from the First Business Entity 123 and the Local Repository may be stored on a computer system local to the Customer Care Provider 111 and/or remote from the Customer Care Provider 111.

The Remedy Limitation Module 115 may be software, a method, and/or a process used to calculate a limitation for a remedy for a customer care provider. The Remedy Limitation Module 115 may determine a limitation for a customer care provider using transaction information from a Local Repository 117 and/or a Global Repository 119. The Global Repository 119 may be a database, a cache, a file system, and/or any other collection of data. The Global Repository 119 may have Transaction Information 127 (e.g. a history of transactions) for one or more business entities. In an embodiment, the Global Repository 119 may have transaction information for business entities that differ from the First Business Entity 123 and may provide the ability for determining a limitation on a remedy across multiple customer care providers.

In another embodiment, the Global Repository 119 may be a virtual repository or an aggregation of data from one or more data sources (e.g. repositories). For example, the Global Repository 119 may be implemented as software that accesses (e.g. reads) the data from one or more local repositories for business entities and presents the data as aggregated in a single repository. The Global Repository 119 may pull the data from the servers (e.g. database servers) of the repositories of the business entities and/or the data may be accessed and the aggregation of the data may be presented to the user.

The Customer Care Provider 111 may be given a Credential 129 to permit access to the Global Repository 119. In an embodiment, the Credential 129 allows the Customer Care Provider 111 and the Remedy Limitation Module 115 to access transaction information ordinarily only accessible by the customer that is requesting customer care. In another embodiment, the Credential 129 may be provided by another customer care provider and/or another business entity.

An Aggregation Module 113 may be software that enables the aggregation of transaction information at a Global Repository 119. The Aggregation Module 113 may be software that pushes the transaction information to the Global Repository 119 and/or enables the transaction information to be pulled to the Global Repository 119. In another embodiment, the Aggregation Module 113 may enable the data to be accessed or read but the data may not be retrieved from the Local Repository 117.

FIGS. 1C-3 depict systems for providing customer support according to embodiments, as described in U.S. patent application Ser. No. 12/022,971, entitled REPOSITORY INFRASTRUCTURE TO STORE TRANSACTION INFORMATION FOR PROVIDING CUSTOMER SERVICE, filed on Jan. 30, 2008 which claims priority from U.S. Provisional Patent Application Ser. No. 60/983,035, entitled REPOSITORY INFRASTRUCTURE TO STORE TRANSACTION INFORMATION FOR PROVIDING CUSTOMER SERVICE filed on Oct. 26, 2007, incorporated herein by reference. FIG. 1C depicts a system for providing customer support in an example of an implementation of distributed customer support credits according to an embodiment. FIG. 1C depicts a simplified system 100 for providing customer support with a repository and permitting access to the repository using a customer care credential that is access information, according to one embodiment. As shown, a repository manager 102, devices 104, and services 106, a repository 108, and a customer care provider 110 are provided.

Devices 104 may be any computing devices. For example, devices 104 include portable music players, personal computers, laptop computers, cellular phones, set-top boxes, televisions, etc. In one example, a user may own multiple devices 104 from different business entities.

Services 106 may be any service that may be provided to devices 104. For example, the services may include Internet download services, such as the downloading of music and/or video, video-on-demand services, etc. In one example, services 106 may be associated with different business entities than a manufacturer of device 104-1. The chances that a user may have devices that interact with devices and/or services from different business entities may be high. Accordingly, to be able to provide customer care for devices that interact with other devices is important.

Repository 108 may store information for a user that may allow limitations on remedies available for a customer care provider to be determined. The information that is stored may be transaction information when a user performs transactions using a device 104-1. The transactions may be with other devices 104-2 and/or services 106. Although a single repository 108 is shown, it will be understood that multiple storage devices may be used and information stored may be distributed among storage devices that are in different locations.

In one embodiment, device 104-1 may be associated with a first business entity, such as the manufacturer of the device. The device may interact with other devices 104-2 and/or services 106. This may be different from standalone devices that may not have been used with other devices. That is, with networking, devices can now interact with other devices and services; however, previously, devices may not have communicated with other devices. In the standalone case, when the device did not work, the manufacturer of the device could determine the problem with the operation of the device because the problem may be isolated to just the use of the device only. However, other devices 104-2 and/or services 106 may be associated with other business entities. Thus, customer service for the first business entity that manufactured device 104-1 may not be able to determine what the problem is unless they have information of how device 104-1 interacted with other devices and/or services.

Activity information for a user may be stored in a number of places. The information may be stored on or at:
  Individual devices
  On hard drives of other devices in my home network
  On dedicated storage on my home network
  At a repository on line (e.g. leased hard disc space) controlled by a user
  At a repository online controlled by a service provider (e.g. from whom I bought content)
  At a repository online controlled by a customer-care service provider designated by a user
  At any number of service providers that make their specific information available to a user or my representative (e.g. my designated service provider) including services provided by manufacturers that may store usage information associated with individual devices This information may be collected by any of the entities (subject to consumer permission) and stored any of the places listed above. For example a music service may keep a record of the purchase transactions, licenses (for DRM protected content) and file distribution records that could be required if a music file does not play (e.g. Did my credit card clear? Did I get the license? Where is the license? Did I get the file? Where is the file? Etc.). A device may keep a record of what licenses and files were delivered to it and where they were stored. Additionally devices in the home network (portable devices, PCs, home servers, game machines, etc.) may track what files and or licenses were transferred to what devices. Additionally devices and software applications may want to track their versioning status including when updates were performed.

Because devices 104 and services 106 may be associated with different business entities, a central customer care infrastructure is provided. When a transaction is performed between device 104-1 and device 104-2 and/or services 106, transaction information may be stored in repository 108. The transaction information may be received from device 104-1 itself and/or devices 104-2/services 106.

The information stored in repository 108 may be securely stored for a user. For example, the user may be able to provide permission to an entity to review the transaction information in repository 108; however, without this permission, customer care provider 110 cannot access the information.

When a problem is encountered with device 104-1, a user can contact customer care provider 110. The user may contact customer care provider 110 in different ways, such as through email, instant message, telephone, etc. The user can then provide customer care provider 110 permission to access repository 108. The information may be accessed and then analyzed to determine a problem that has occurred with device 104-1. For example, transaction information between service 106 and device 104-1 may be analyzed. This transaction information may be associated with a second business entity that is different from the first business entity associated with device 104-1. Conventionally, this information may not have been available to customer care provider 110. However, using repository 108 or a group of distributed repository using commonly defined interfaces, this information is stored and available to customer care provider 110 upon permission from the user.

Figure 2:
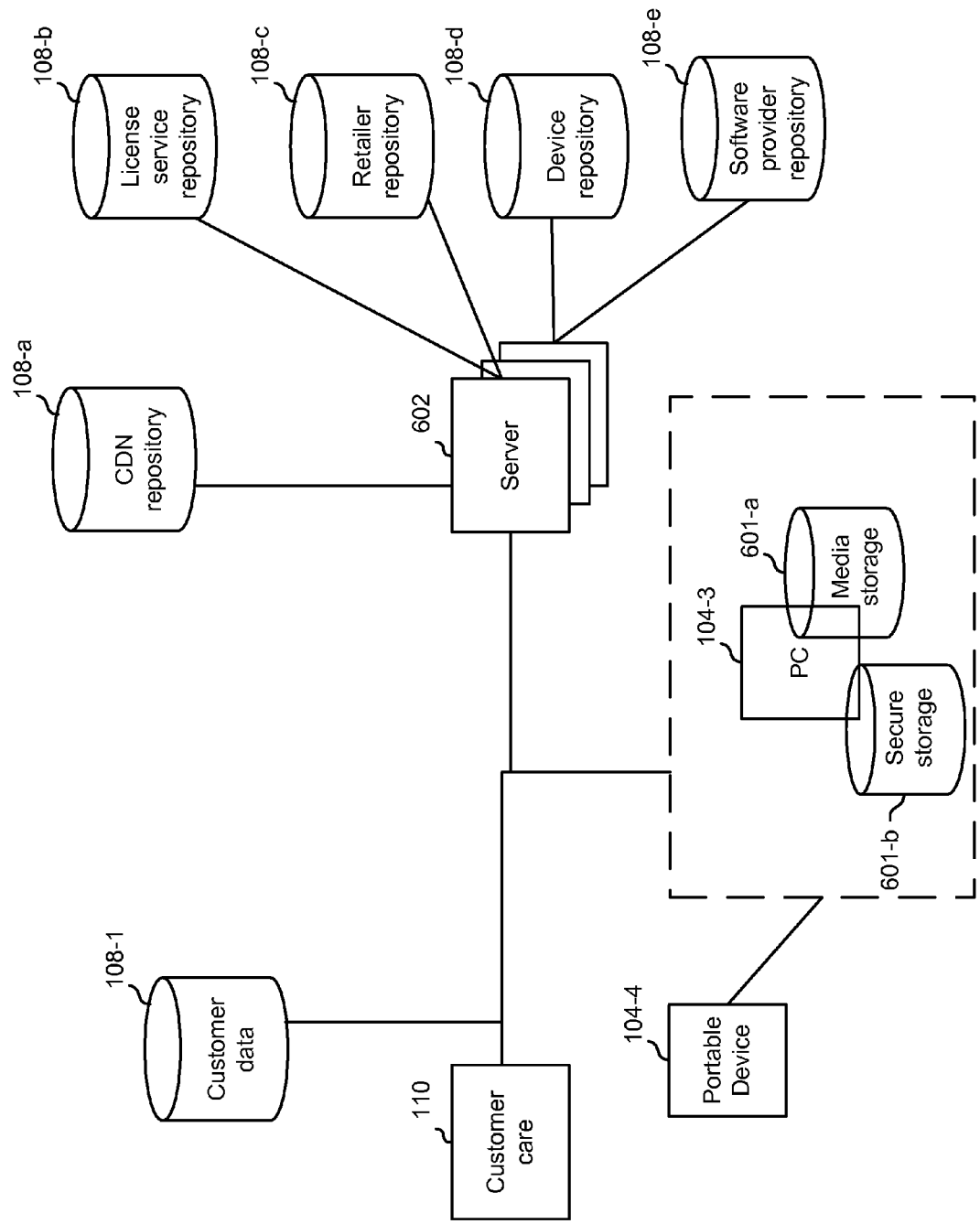
FIG. 2 depicts a system for providing customer support in an example of an implementation of distributed customer support credits according to an embodiment.

FIG. 2 depicts a system for providing customer support in an example of an implementation of distributed customer support credits according to an embodiment. FIG. 2 depicts a more detailed example of system 100 according to one embodiment. Device 104-3 may be a personal computer (PC) or other sophisticated computer operating environment. Storage 601-*a* is the media storage area of the PC. Secure storage 601-*b* is the secure metadata storage area of the PC. Device 104-4 is a portable device that can be used for playing audio or video files. Customer care provider 110 is the provider of customer care. This could be a representative from a device manufacturer, a retail service provider or a dedicated customer care provider.

Customer repository 108-1 stores customer data, which may be local to a consumer on their home network or online at a service provider. Transaction repositories 108-*a*-108-*e* are a family of transaction record data repositories that can be queried to find out data about the various transactions and the state of the various devices. There may be many of these for multiple device manufacturers, retailers, and service providers. These entities may be value chain participants, which may be entities that participate in some way in the transaction.

Repository 108-*a* is the CDN (Content Delivery Network) transaction data repository. Records of files that were distributed may be stored here. For example, if a movie was delivered to a user, the user information, such as the device to which it was delivered and the directory in which it was stored, may be stored. If the customer care representative wants to know if a file was delivered and where it was delivered to, this is the database that could be queried.

Repository 108-*b* is the license service transaction data repository, which may store records of distributed licenses. Licenses may be the permissions associated with the use of a media file and may include the key for decrypting them. For example, if a movie was delivered to a user, this database would store the delivery information, such as the device to which it was delivered and the directory in which it was stored. The customer care representative can query this repository to determine if a license was delivered and where it was delivered to.

Repository 108-*c* is the retail transaction data repository. This is where the original transaction ID would be stored and associated with that transaction ID would be the information about the retail transaction; for example, information on whether the transaction (e.g. credit card) successful, whether a trigger generated to cause the issuance of a license, whether a trigger generated to cause the delivery of the media file and were these triggers acknowledged as having been received and acted upon.

Repository 108-*d* is the device database. This is generally maintained by the customer care representatives of the manufacturer of the device in question (though it could be housed by anyone with whom the customer registers; e.g. a consumer electronics retail store or a dedicated customer support company).

Repository 108-*e* is the software and software version database. This database includes information on which devices have what versions of which software. This is generally maintained by the customer care representatives of the developer of the software in question (though it could be housed by anyone with whom the customer registers; e.g. a consumer electronics retail store or a dedicated customer support company).

A customer care representative may be from any of the value participants (retailer, device manufacturer, CDN, license issuer, dedicated customer care service, etc.). When the consumer contacts their customer care representative (by any means including phone, email, instant messaging, etc.) the following series of events may take place. The representative asks for permission from the consumer to access their data records as stored at the various representatives (retailers, license services, etc.). The customer gives the representative that permission. That permission could be given in writing, over the phone or electronically. Security may be a component of this permission and the actions that follow, which will be described in more detail below.

Once the customer care representative has permission, different repositories can be queried (108-*a* thru *e*) for relevant data. The repositories may be queried through various servers 602. Different things can be determined to provide customer care:

- Did the transaction succeed at the retailer (e.g. did the credit card clear)? There may be a transaction ID stored on the consumer's device (e.g. their PC). This transaction ID could be stored in a specific place for transaction IDs, in the DRM secure database or in a cookie associated with the browser. In the case of a cookie, when the transaction begins at the retailer, the retail web site leaves a cookie in the cookie repository for the browser used for the transaction. This cookie can then be read later by the appropriate application to determine the transaction ID. The transaction ID may be needed to determine which transaction the customer care agent is interested in.
- Was the License service contacted to issue the customer a license and if it was, was the license issued and to what device and what location (directory, etc.)?
- What is the location of the license service should it need to be contacted by the customer care provider 110?
- Was the CDN contacted to deliver the file and if it was, was the file received and to what device and what location (directory, etc.).
- What is the location of the CDN should it need to be contacted by t customer care provider 110?
- What is the model number of the device and what version of firmware is running on the device (or what OS and version number if a PC)? The end user may need to input a serial number for this to happen or a software application on the device may need to query the device to determine this.
- What software may be involved in the processes at hand (e.g. DRM, media player, download manager, etc.) and what versions of that software? The end user may need to input a serial number for this to happen or may have to run the software to find this out manually.

In one example, a user may purchase a device 104-1 from a first business entity. For example, a user may purchase a portable music player from a first manufacturer. The user will then use the device and/or services in various transactions where transaction information may be stored for the transactions.

Figure 3:
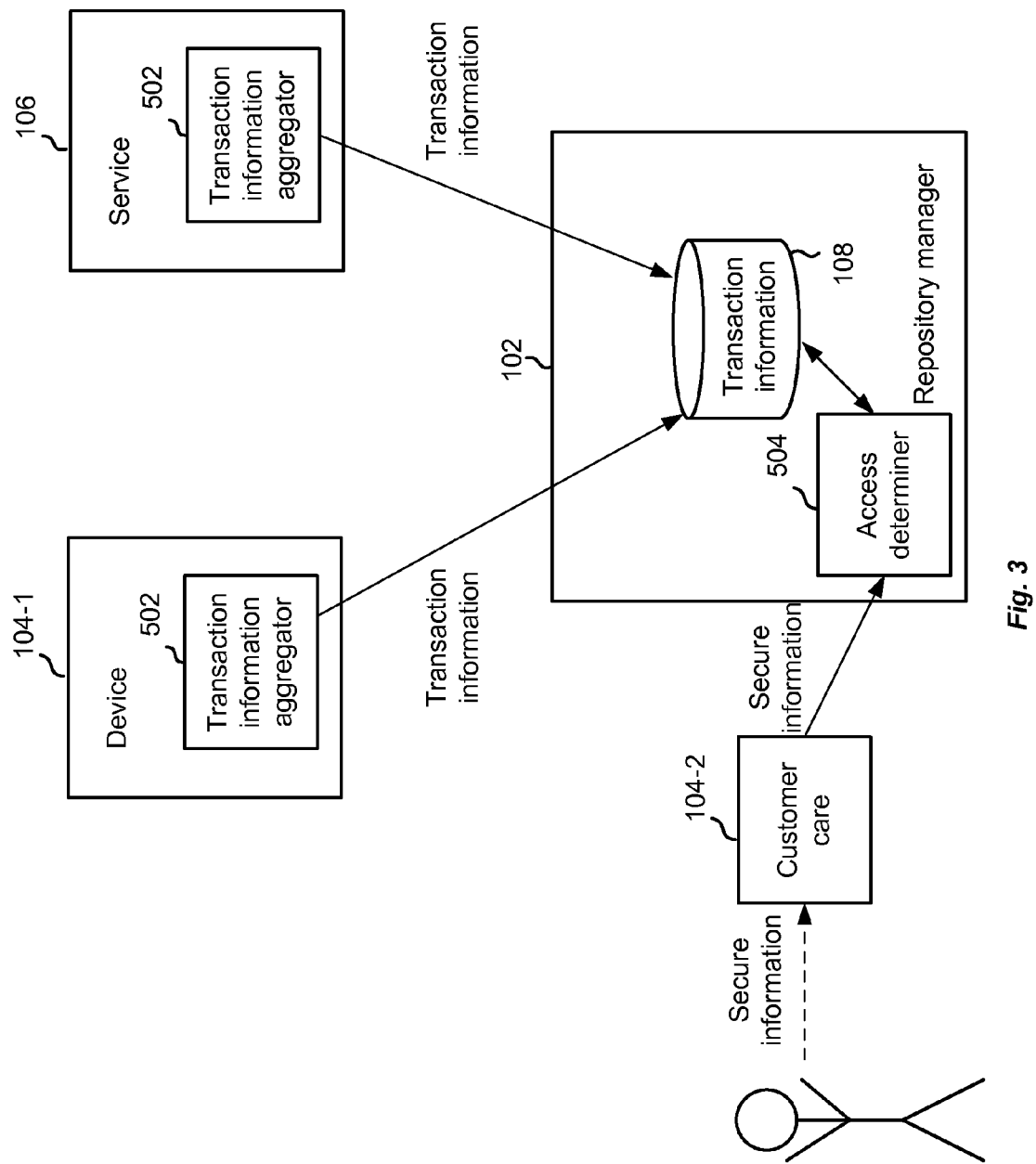
FIG. 3 depicts a system for providing customer support in an example of an implementation of distributed customer support credits according to an embodiment.

FIG. 3 depicts a system for providing customer support in an example of an implementation of distributed customer support credits according to an embodiment. FIG. 3 depicts a more detailed example of system 100 according to another embodiment. As shown, device 104-1 and service 106-1 may participate in a transaction. Although service 106-1 is depicted, the transaction may be performed with another device 104. During the transaction, different information may be exchanged and events may be performed based on the type of transaction. For example, different events that may be tracked for software include: the function performed (e.g., media playing), vendor and software version for an application, and/or embedded software used. For content sales, examples of events that may be tracked, include, but are not limited to, the following: a status of secure proof of purchase may be provided if it was sent, when it was sent, where it was sent, and/or why it was not sent may be included. Also, a status of receipt of the secure proof of purchase may be provided as in a license trigger in a browser or at a license server, and also if a license was sent/received and when the license was sent and to where, and also when the license was received and where it was stored. Other information may be when a file was sent and where it was sent to, where the file was received and where it was stored. Additionally, other information may be: was a file transferred, copied, burned to a CD, and if so, how many times, when, where, etc.

For subscription-based services, the status of all subscriptions may be included in transaction information. Also, for home networks, any registered domains, registered devices in the domains, and when a file is transferred to one of these devices may be provided.

A transaction information aggregator 502 may aggregate this information to form a transaction history. Transaction information aggregator 502 may then send it to customer care manager 102 for storage in repository 108. The transaction information received or accessed from different sources and may be correlated together using a transaction ID.

When a user wants to contact customer care, it may contact customer care provider 110. The user can provide secure information to allow access to transaction information. Customer care provider 110 may use the secure information to access transaction information in repository 108. For example, secure information may be sent to an access determiner 504, which can then access repository 108 to determine transaction information associated with the user. Access determiner 504 then determines which information can be accessed. For example, a user may desire that only a portion of the information be accessed depending on the problem being troubleshooted.

Accordingly, a user may contact customer care associated with a business entity. This business entity may analyze transactions that may have been performed with other business entities. The transaction information is stored in a repository in which a user may give permission to the business entity to access. This may allow better troubleshooting of a problem because devices may interact with other devices and/or services that are associated with different business entities. Whereas, if the business entity did not have access to this information, it may not be able to troubleshoot the problem.

Security may be used in performing customer care. This may ensure the customer's information is private. Also, retailers may not want to share their customer information and so the access to the customer records should not only be based on permission from the user but should be limited to that data needed to solve the problem at hand and should not be retained after the problem is resolved. Consequently, the data may need to be functionally limited—that is only those records that are needed—and time limited—that is only for a prescribed period of time. Certificates (likely X-509) may be used to make the attestation that I (the service provider—including the content care rep) am who I say I am. If a service provider is not on a white list other service providers should not speak with them.

Additionally, customer care provider 110 may make an attestation that they are approved to provide the service they say they are going to provide. The companies that work together in this network may have a process for determining that some one is in fact a "retailer" or a "customer care service provider" or a "license service" and those assertions should be provided electronically, for example, as SAML (Security Assertions Markup Language) assertions.

A transaction identifier (ID) for the transaction may have been generated. Also, a retailer ID may also be associated with the transaction that was associated with the purchase. A user may sign using an assertion the IDs, which may be passed to a digital rights manager (DRM). The DRM may already have that information and can hand it directly to customer care provider 110 (assuming the DRM is a participant in the system). In another scenario, the transaction ID and the retailer ID are left on the user's device as a "cookie". The cookie may include the identity of the retailer and the location (URL) where customer care assertions should be presented. These cookies may be encrypted and may include a clear text (unencrypted) representation of where customer care provider 110 should present their credentials.

Customer care provider 110 may receive the assertion. The assertion may allow customer care provider 110 to access the transaction information. By presenting the assertion, customer care provider 110 is saying I am company X (as attested to by my certificate) and I am on your white list, I am allowed to do customer care (as attested to by my SAML assertion), and I am representing this customer's wishes as attested to by his signature (for which you have acquired the public key when you did the original transaction). Additionally, customer care provider 110 is stating I have an assertion (signed by the customer) that I would like the specific information requested (likely in a predefined XML schema). Customer care provider 110 may ask for a particular granularity, e.g. I have the original license because the file was played on the user's PC but an additional license for a second device was not received and my query is with regard to the additional license.

The assertion is used by the retailer to determine which transaction information to access. For example, the assertion includes the transaction ID and that is used to determine the information. The retailer may include the user's public key and that can be used to decrypt the assertion. The transaction ID for the user may need to be associated with the retailer. When the user visits the retail web site, a device 104 receives a unique ID or personality. The user may be given "customer care" ID in that creates a machine personality (this is a standard mechanism whereby a combination of characteristics of a PC are used to create a unique identity). This may have already been performed by the DRM. On a consumer electronics device (like a portable media player), other mechanisms are used to "personalize" the device—a unique ID—usually by either putting a unique number in a secure place on the device at the time of manufacture or by personalizing the device by connecting it to a DRM personalization service when the device is first used. This Unique ID (UID) is used to identify device 104 that made the original purchase.

The unique ID may be used to create either a certificate and/or a private key (PKI) for device 104. The private key can be used to encrypt communications between the user's device 104 and customer care provider 110. The certificate can be used to sign communications to affirm that they came from the same device 104 that made the original transaction.

The binding (that is cryptographic association with the entity needing the customer care service) can also be done to the user or to an account. Certificates and Private Keys can be generated from association with other elements associated with the User or Account like user ID and password, fingerprint, retinal scan, etc.

Once the retailer knows to whom or what the content was sold, the entity (customer care provider 110) can be associated by the retailer with the transaction ID of every transaction. In this way, when another entity appears asking for data about the transaction, the retailer can know that the request was authorized by the entity that made the original purchase.

In the event that customer care provider 110 needs to query an entity down the line from the retailer—e.g., a license service—customer care provider 110 retrieves a certificate from them that gives customer care provider 110 permission to have the data records associated with a particular transaction that the service (e.g. license service) has done on the retailer's behalf.

Logging Exceptions

As indicated above, a user may attempt to abuse the system and the distributed environment, as described in FIG. 1C-3, may present particular issues for preventing abuse of the system. For example, a user might fill all ten devices in their domain with content (e.g., a device might easily hold 100 movies) and then claim that the devices were all lost. Then, the user could receive ten new devices from a first customer care representative, and then repeat the process with a different customer care representative to receive permission to receive ten more devices again (e.g., after selling the devices containing the movies). This could be done for as many customer care representatives as were available (e.g., perhaps, in a mature system, hundreds).

In one or more embodiments, the exceptions (e.g., the use of customer care credits) can be logged along with a domain ID in a common repository that can be accessed by any customer credential. A customer service provider may need a customer care credential (e.g. a certificate or a SAML assertion, or other form of security of information) in order to access the database or repository with customer care credit information. In an embodiment, the customer care provider may need the same credentials in order to access the common information (e.g. domain information, purchase history, etc.) to provide customer care.

Figure 4:
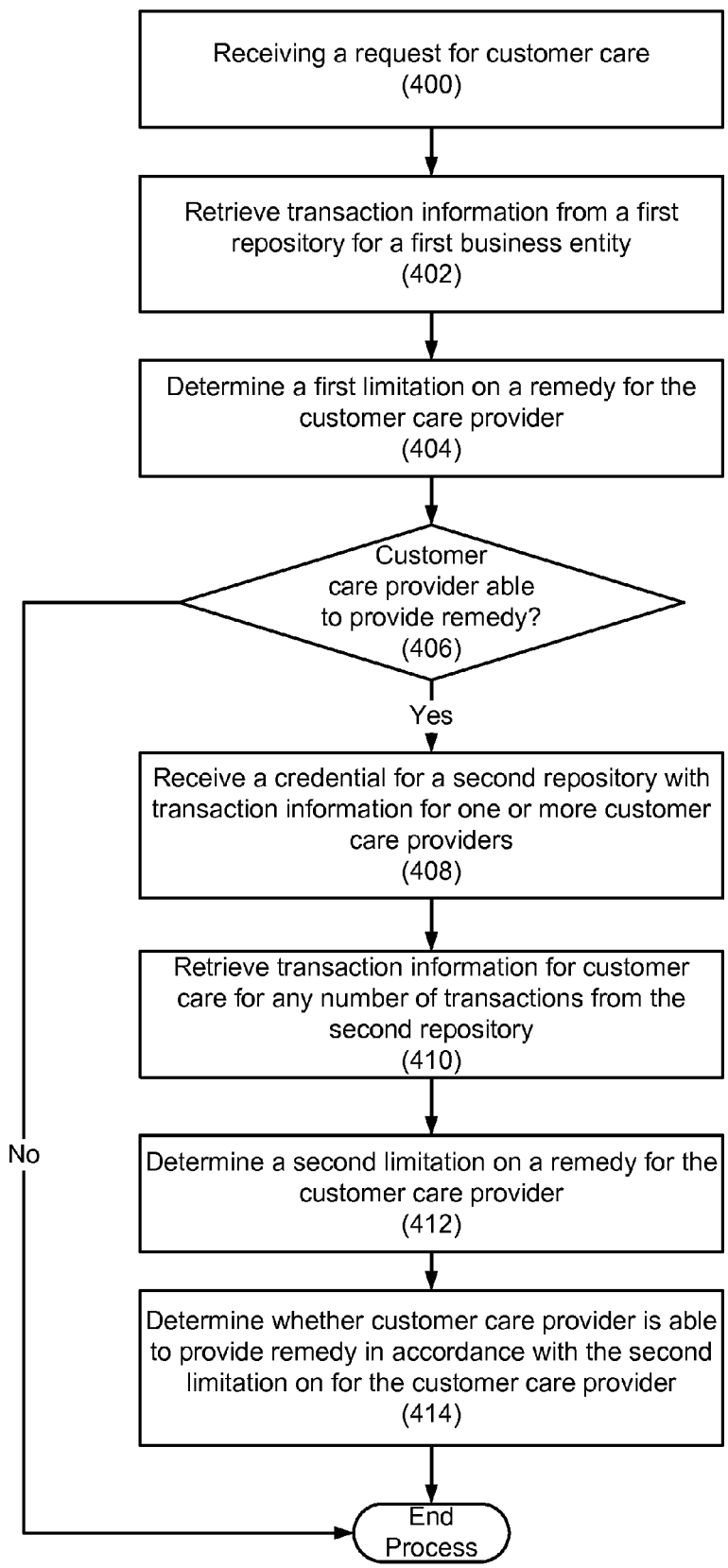
FIG. 4 depicts a flow chart for an example of an implementation of distributed customer support credits according to an embodiment.

FIG. 4 depicts a flow chart for an example of an implementation of distributed customer support credits according to an embodiment. A request may be received for customer care (400). The request may be received in manners including, but not limited to, the following: by email, over the phone, a request from a client software application, and/or using any other method for communicating a request for customer care. The request may be handled by a customer care provider using a particular remedy.

Transaction information may be retrieved from a first repository for a first business entity (402). The transaction information stored in the first repository may be transaction information on customer care transactions for a customer care provider or a first business entity for the customer care provider. The customer care provider for the first business entity may be assigned to provide customer care for the request and transaction information in a local repository may indicate whether the customer care provider may be capable of handling the request.

In an embodiment, the transaction information retrieved may be information on prior customer care provided that is relevant to aspects of the current customer care request and/or a heuristic used to determine a limitation on the remedy. For example, the transaction information may be information concerning the device the customer requested customer care for in the request, the customer (e.g. user requesting customer care), the software (e.g. software that the user needs support for), and/or the customer care provider (e.g. representative or provider handling the request).

A first limitation on a remedy may be determined for the customer care provider (404). The first limitation on the remedy may indicate whether the customer care provider can handle the customer care request. The first limitation may be calculated or determined using transaction information local to the customer care provider and may not require global transaction information (e.g. transaction information from one or more customer care providers).

A heuristic may be used to calculate the limitation on the remedy for the customer care provider. For example, a heuristic may be defined that limits the provision of a particular remedy to a percentage of all customer care transaction received by the customer care provider and the number for the limitation on the remedy may need to be calculated using the transaction information for the customer care provider. In another example, the particular remedy may have a limitation of a cap on the number that can be provided for the customer care provider.

A determination may be made as to whether the customer care provider can provide the remedy for the request (406). The determination may be made using the transaction information from the first repository and the first limitation, such as information on the user requesting the customer care or the customer care provider (e.g. representative handling the request). For example, the retrieved transaction information from the first repository may indicate that the user has previously received the remedy that may be used to handle the initial customer care request and the number of times that the user received the remedy may indicate whether further provision of the remedy should be limited or prevented for the user/customer requesting customer care. The user/customer may have exceeded the first limitation on the remedy for the customer care provider.

In another example, the transaction information from the first repository may indicate whether the customer care provider can provide the remedy. The customer care provider or representative may be limited in the provision of the particular remedy. Continuing with the example, the customer care provider may have exceeded the number of times that the customer provider is allowed to provide the particular remedy as indicated with the first limitation.

If a determination is made that the customer care provider is not able to provide the remedy (406), then the process may end and other options for handling the request may be performed. For example, the request may be handled by or referred to another customer care provider.

Alternatively, if a determination is made that the customer care provider is able to provide the remedy (406), then a credential is received for a second repository and the second repository has transaction information for one or more business entities (e.g. one or more customer care providers) (408). The credential may permit access to the second repository, such as a global repository with transaction information for one or more business entities (e.g. customer care providers, retailers, digital service providers, etc.). For example, the credential may be access information that allows the customer care provider to access transaction information about the customer that would ordinarily only be provided or accessible to the customer, such as transaction information for a customer at a second business entity. The credential may be an identifier, a password, and/or any other authorization mechanism or process. In another embodiment, the second repository may be a repository for a second business entity, such as another customer care provider.

Transaction information for any number of transactions may be retrieved from the second repository (410). The credential may allow the customer care provider to access the transaction information from the second repository. In an embodiment, there are no transactions for the user. The transaction information may be used both to calculate the second limitation on the customer care provider (412) and determine whether the customer care provider can provide the remedy in accordance with the second limitation (414). For example, the exact remedy limitation (e.g. a number of a remedy allotted by a device manufacturer) may be calculated with the transaction information, such as calculating a percentage of users permitted to receive a remedy across customer care providers. And, the transaction information history may indicate whether the supply of the remedy that the customer care provider and/or one or more customer care providers has used exceeds the exact remedy limitation, such as by determining the number of a remedy that have previously been provided by the customer care provider(s).

In an example, a heuristic may be used that limits the provision of a remedy to 1% of all users of a device, and the transaction information for the device manufacturer may be accessed by a customer care provider with a credential to calculate the limitation (e.g. calculate 1% of all users for the device). Continuing with the example, the limitation may allow a number of users able to receive the remedy (e.g. 400 users allotted by the business entity for the remedy) and the transaction information may indicate that a number less than the calculated number for the limitation have been provided by customer care providers, thereby allowing a customer care provider to provide the user with the remedy. In an embodiment, the transaction information may be accessed to determine whether the user requesting the remedy has not already been provided by another customer care provider in a particular time frame and provide them remedy if the user has not already been provided to the user.

Distributed Customer Support Credits

Media distribution networks may use a domain model. A domain model may provide that content, such as encrypted content, is bound to a set of devices of a domain rather than to an individual or particular device. Content may also be bound to a set of users associated with that domain of devices. The users may receive content either on the bound device or streamed to another device that might have a dynamic credential (e.g., logging in to a service as we do with email) or a persistent credential (e.g., a cable service set top box or a mobile phone). Examples of different types of customer support credits, include, but are not limited to, the following:

- Device/Domain based credits—credits that are applied to resolve issues associated with joining and leaving devices from a Domain
- Streaming Service based credits—typically there are a limited number of streams allowed per account (to avoid account sharing). These credits may assure that legitimate customers are not shut out of legitimate streaming usages.
- Content based credits—once a right has been issued electronically, there may be no way to revoke that right on the device (e.g., it may no longer be on the network). Though the right may live in an accessible database on the network, content owners do not want to revoke the right (e.g., and return the money) because of potential misuse. However, at the sales entities discretion, this right could be revoked and the money returned if there is a limitation on abuse.

The following are examples of the kinds of credits that might be associated with different entities, including, but not limited to Device/Domain Based Credits, Streaming Service Based Credits, and Content Based Credits:

Device/Domain Based Credits
1. The maximum number of concurrent Devices per Domain (e.g. n)
   a. x % of Domains may exceed n Devices for a period of up to y days
2. The maximum number of times a Device is allowed to be added back to a previous Domain it had belonged to (n times/d days)
   a. x % of Devices may be added n times
   b. y % may be added m times etc.
3. The maximum number of unverified Device removals from a Domain (n times/d days)
   a. x % of Domains may have Devices removed n times
   b. y % may have Devices removed m times
4. The maximum number of Domains a Device may be a member of at one time
   a. x % of devices may be a member of n domains for a period not to exceed a days
5. The maximum number of concurrent Users that may be associated with a Domain
   a. x % of accounts may have n Users for up to a days
   b. y % of accounts may have m Users for up to b days Streaming Service Based Credits
1. Maximum number of persistently bound streaming devices per Account
   a. x % of users associated with the domain may have n persistently bound streaming devices for up to a days
2. Maximum number of concurrent streaming sessions
   a. x % of users associated with the domain may have n streams for up to h hours Content Based Credits
1. The maximum number of allowed discrete DVD Burns allowed per associated Rights Token
   a. 10% of Users may have 2 discrete DVD burns per associated Rights Token
   b. 2% of Users may have 4 discrete DVD burns per associated Rights Token
2. Maximum number of times a used Rights Token may be removed from a locker (0)
   a. 1% of Rights Tokens may be removed from a Rights Locker 1 time.

Although the description has been described with respect to particular embodiments thereof, these particular embodiments are merely illustrative, and not restrictive. Although customer care is described, it will be understood that the repository may be used for other purposes, such as for sales. For example, the transaction information may be used to recommend other customer care providers, devices and/or services to a user.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, and store the program for use by or in connection with the instruction execution system, apparatus, system, or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method, comprising:
receiving, by one or more processors, a request for customer care by a first customer care provider associated with a first business entity;
requesting, by the one or more processors, a second business entity for permission to allow the first customer care provider to access a repository,
wherein the repository comprises transaction information including transaction history,
wherein the transaction history comprises a history of a plurality of transactions associated with a service provided by the second business entity,
wherein a transaction identification information (ID) of a transaction of the plurality of transactions and a retailer ID of the transaction are stored on a user device as a cookie, and
wherein the cookie includes a uniform resource location (URL) where customer care credentials are presented;
accessing, by the one or more processors, the transaction history from the repository using customer care credentials based on the permission granted by the second business entity;
determining, by the one or more processors, a number of users to whom the first customer care provider is allowed to provide a remedy using the transaction history;
determining by the one or more processors, using the transaction information, whether a remedy corresponding to the received request for customer care has been provided by a second customer care provider in a particular time frame; and
allowing, by the one or more processors, the first customer care provider to provide the remedy based on a lack of provision of the remedy.

2. The method in claim 1, wherein the transaction information comprises information that corresponds to customer care credits previously provided.

3. The method in claim 1, further comprising:
determining, by the one or more processors, the number of users using a heuristic, and the transaction information.

4. The method in claim 1, wherein the transaction information comprises at least one of the number of users, a number of devices, a number of accounts, a number of domains, a number of credits for the first customer care provider, or a number of credits a user has previously obtained.

5. The method in claim 1, further comprising:
retrieving, by the one or more processors, a local transaction information from a local repository,
wherein the local repository comprises the local transaction information associated with the first business entity; and
determining, by the one or more processors, ability of the first customer care provider to provide the remedy based on the local transaction information associated with the first business entity.

6. The method in claim 1, wherein the second business entity is at least one of a third customer care provider, a retailer, a digital rights license provider, a streaming provider, a content provider, or a device manufacturer.

7. The method in claim 1, wherein determining the number of users for remedy by the first customer care provider further comprises:
calculating, by the one or more processors, the number of users for the remedy using a heuristic, and the transaction information; and
examining, by the one or more processors, the transaction information to determine whether the number of users has been exceeded.

8. A non-transitory computer-readable medium having stored thereon, computer-executable instructions for causing a computer to execute operations, the operations comprising:
receiving a request for customer care by a first customer care provider associated with a first business entity;
requesting a second business entity for permission to allow the first customer care provider to access a repository,
wherein the repository comprises transaction information including transaction history,
wherein the transaction history comprises a history of a plurality of transactions associated with a service provided by the second business entity,
wherein a transaction identification information (ID) of a transaction of the plurality of transactions and a retailer ID of the transaction are stored on a user device as a cookie, and
wherein the cookie includes a uniform resource location (URL) where customer care credentials are presented;
accessing the transaction history from the repository using customer care credentials based on the permission granted by the second business entity;
determining a number of users to whom the first customer care provider is allowed to provide a remedy using the transaction history,
determining, whether a remedy corresponding to the received request for customer care has been provided by a second customer care provider in a particular time frame, using the transaction information; and
allowing the first customer care provider is to provide the remedy based on a lack of provision of the remedy.

9. The non-transitory computer-readable medium of claim 8, wherein the transaction information comprises information that corresponds to customer care credits previously provided.

10. The non-transitory computer-readable medium of claim 8, determining the number of users using a heuristic, and the transaction information.

11. The non-transitory computer-readable medium of claim 8, further comprising:
retrieving a local transaction information from a local repository, wherein the local repository comprises the local transaction information associated with the first business entity; and determining ability of the first customer care provider to provide the remedy based on the local transaction information for the first business entity.

12. The non-transitory computer-readable medium of claim 8, wherein the second business entity is at least one of a third customer care provider, a retailer, a digital rights license provider, a streaming provider, a content provider, or a device manufacturer.

13. The non-transitory computer-readable medium of claim 8, wherein determining the number of users for remedy by the first customer care provider further comprises:

calculating the number of users for the remedy using a heuristic and the transaction information; and examining the transaction information to determine whether the number of users has been exceeded.

14. A system, comprising:

one or more processors configured to:

receive a request for customer care by a first customer care provider associated with a first business entity;

request a second business entity for permission to allow the first customer care provider to access a repository, wherein the repository comprises transaction information including transaction history, wherein the transaction history comprises a history of a plurality of transactions associated with a service provided by the second business entity, wherein a transaction identification information (ID) of a transaction of the plurality of transactions and a retailer ID of the transaction are stored on a user device as a cookie, and wherein the cookie includes a uniform re source location (URL) where customer care credentials are presented;

access the transaction history from the repository based on customer care credentials and the permission granted by the second business entity;

determine whether a remedy for the request is available with the first customer care provider based on the transaction history;

determine, based on the transaction information, whether a remedy corresponding to the received request for customer care has been provided by second customer care provider in a particular time frame; and allow the first customer care provider to provide the remedy based on a lack of provision of the remedy.

15. The system of claim 14, wherein the transaction information comprises information that corresponds to customer care credits previously provided.

16. The system of claim 14, wherein availability of the remedy for the request is determined based on a heuristic and the transaction information.

17. The system of claim 14, wherein the one or more processors are further configured to:

retrieve a local transaction information from a local repository, wherein the local repository comprises the local transaction information associated with the first business entity; and determine ability of the first customer care provider to provide the remedy based on the local transaction information for the first business entity.

18. The system of claim 14, wherein the second business entity is at least one of a third customer care provider, a retailer, a digital rights license provider, a streaming provider, a content provider, or a device manufacturer.

19. The system of claim 14, wherein the or more processors are further configured to:

determine a number of users to whom the first customer care provider is allowed to provide the remedy based on a heuristic and the transaction information; and examine the transaction information to determine whether the number of users has been exceeded.

20. The system of claim 14, wherein the transaction information comprises at least one of a number of users, a number of devices, a number of accounts, a number of domains, a number of credits for the first customer care provider, or a number of credits a user has previously obtained.

* * * * *